United States Patent [19]

Schrenk

[11] Patent Number: 4,814,849

[45] Date of Patent: Mar. 21, 1989

[54] MONOLITHICALLY INTEGRATED SEMICONDUCTOR CIRCUIT

[75] Inventor: Hartmut Schrenk, Haar, Fed. Rep. of Germany

[73] Assignee: Siemens Aktiengesellschaft, Berlin and Munich, Fed. Rep. of Germany

[21] Appl. No.: 117,348

[22] Filed: Oct. 27, 1987

Related U.S. Application Data

[63] Continuation of Ser. No. 759,041, Jul. 25, 1985, abandoned.

[30] Foreign Application Priority Data

Jul. 31, 1984 [DE] Fed. Rep. of Germany ....... 3428235

[51] Int. Cl.[4] ..................... H01L 23/02; H01L 25/04; H01L 29/78; G06K 19/06

[52] U.S. Cl. ........................................ 357/74; 357/84; 357/41; 357/23.13; 235/488; 235/492

[58] Field of Search .................. 357/74, 84, 41, 23.13; 235/488, 492

[56] References Cited

U.S. PATENT DOCUMENTS 3,518,494 6/1970 James .................................. 357/84
4,434,361 2/1984 Meinguss et al. .................. 235/487

*Primary Examiner*—Andrew J. James
*Assistant Examiner*—Robert P. Limanek
*Attorney, Agent, or Firm*—Herbert L. Lerner; Laurence A. Greenberg

[57] ABSTRACT

A monolithically integrated semiconductor circuit assembly includes a silicon substrate, an active layer with active electrical structures in a semiconductor circuit disposed on the silicon substrate, a passivating layer disposed on the active layer, at least one electrically conducting protective layer disposed on the passivating layer at least above the active electrical structures, and a casing disposed above the protective layer.

6 Claims, 2 Drawing Sheets

K3
K1
K2
6
4
K4
4a

K3
K1
K2
6
4
K4
4a

SP1
SP2
V1
V2
LES
K1
4a
K2
K4
K3
4
8
T1
T2

MONOLITHICALLY INTEGRATED SEMICONDUCTOR CIRCUIT

This application is a continuation of application Ser. No. 759,041, filed July 25, 1985.

The invention relates to a monolithically integrated semiconductor circuit, having a silicon substrate, an active layer, a passivating layer on top of the active layer, and a casing.

As is well known, MOS circuits are produced in a process having several steps, in which the semiconductor substrate that is used is structured in the desired manner. Conversely, the function and properties of the circuit can be determined by analyzing the structure. With the aid of a light microscope, it is possible to carry out a light-optical analysis. In this manner, the information stored in a ROM, for instance, can also be gathered. In electrically programmable memories ($E^2$ PROMs), the memory content can be subjected to an electrical analysis, for instance, by sampling the state of the charge of the storage cells by means of electron beams and by examination of the potential contrast. An indirect analysis by the reaction of the memory state on the peripheral logic, which must be wired to the memory, can likewise not be precluded. An example of this is the measurement of the potential on the column lines after a memory address is set. Such measurements, however, presume that the surface is completely exposed and can be scanned electro-optically.

There are applications for integrated circuits, especially for memory circuits, in which an analysis of the circuit and the memory content by unauthorized persons must be prevented. Examples of this are security and access systems, accounting and recording systems and debit or credit systems in which so-called chip cards are used. In this case, data which are stored on each card are checked before every use of the card and are provided to prevent misuse of the card. In addition, each chip can be provided with a special security logic which is to block the enable circuit of the memory or is to make the read-out dependent on an enabling procedure. The ability to perform an analysis of the circuit or the memory content with fraudulent intent, can therefore jeopardize the reliability of the system in question.

It is accordingly an object of the invention to provide a monolithically integrated semiconductor circuit which overcomes the hereinafore-mentioned disadvantages of the heretofore-known devices of this general type, and in which an electrical analysis of the circuit and the state of the circuit is prevented.

With the foregoing and other objects in view there is provided, in accordance with the invention, a monolithically integrated semiconductor circuit assembly comprising a silicon substrate, an active layer with active electrical structures in a semiconductor circuit disposed on the silicon substrate, a passivating layer disposed on the active layer, at least one electrically conducting protective layer disposed on the passivating layer covering the semiconductor circuit at least above the active electrical structure, and a casing disposed above the protective layer.

In accordance with another feature of the invention, the passivating layer is electrically conductingly connected at least at one point through the passivating layer to the semiconductor circuit in the active layer.

In accordance with a further feature of the invention, the semiconductor circuit is a security logic circuit and the protective layer is connected into the security logic circuit as an electrical connecting part.

In accordance with an added feature of the invention, the semiconductor circuit includes a logic gate having an input side, the at least one protective layer includes at least two independent protective layers being connected to the input side of the logic gate and being acted upon by a signal essential for operation of the semiconductor circuit to be protected.

In accordance with a concomitant feature of the invention, there are provided contacts recessed through the passivating layer to the at least one protective layer, the contacts being geometrically placed for preventing independent external contact of an individual one of the contacts, such as by a probe.

Other features which are considered as characteristic for the invention are set forth in the appended claims.

Although the invention is illustrated and described herein as embodied in a monolithically integrated semiconductor circuit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
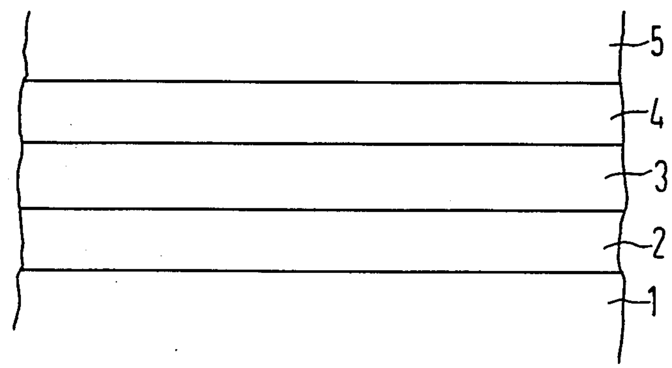
FIG. 1 is a fragmentary, diagrammatic, side-elevational view of an integrated circuit.

Referring now to the figures of the drawings in detail and first, particularly, to FIG. 1 thereof, there is seen the construction of an integrated MOS circuit in silicon gate technology. A silicon crystal 1 several 100 μm thick serves as the mechanical carrier. The electrically important structures such as transistors, capacitors, resistors and conductor runs, which may be formed of aluminum or polysilicon, are disposed in several active zones 2 that are only a few micrometers thick, on the surface of the crystal 1. Toward the top, the active region 2 is protected mechanically and electrically by an insulating passivating layer 3 which may be formed of silicon nitride. A protective layer 4 is disposed on top of the passivating layer 3, according to the invention. Finally, the circuit is completely enclosed by a casing material 5. The protective layer 4 acts as an equipotential surface which shields the circuit part underneath in the active layer 2, against any electrical analysis. Since the protective layer 4 is firmly connected to the layers underneath, its removal results in the destruction of the electrical function of the circuit. In particular, damage or destruction of non-illustrated external contacts can accompany such removal.

Figure 2:
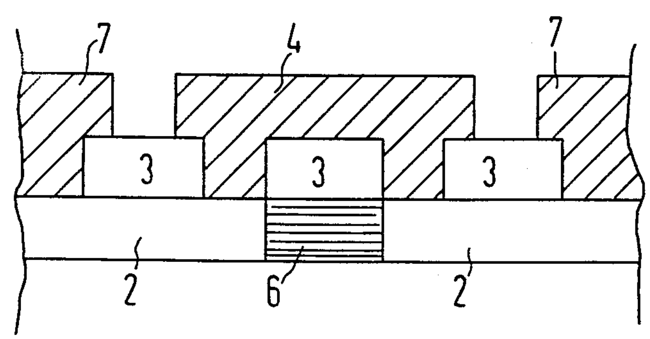
FIG. 2 is a fragmentary cross-sectional view of an integrated circuit.
Figure 3:
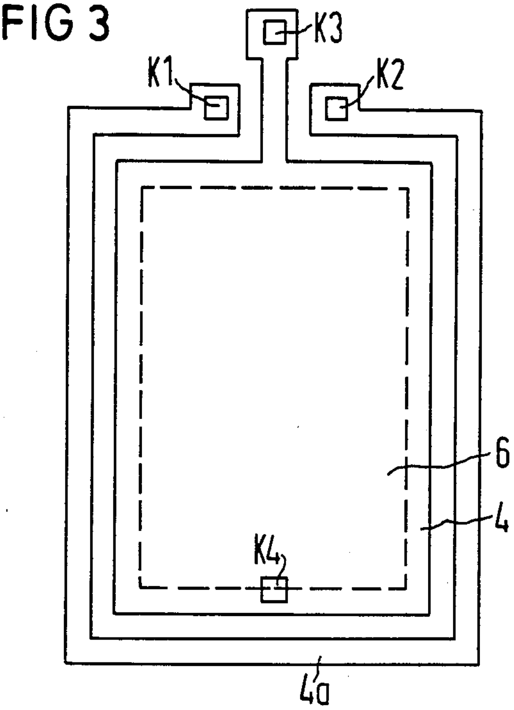
FIG. 3 is a top-plan view of an application of the circuit.
Figure 4:
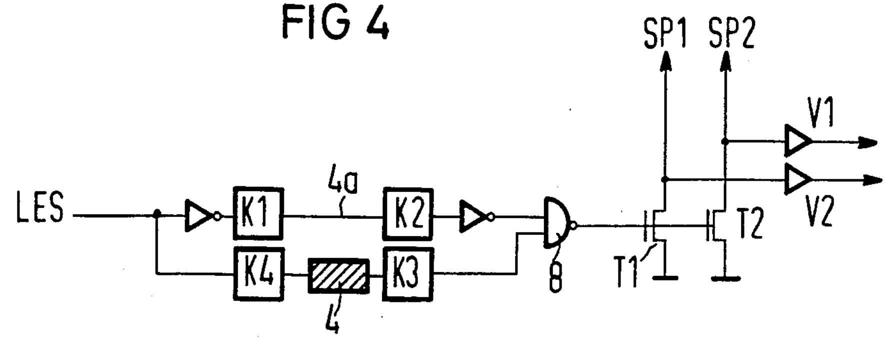
FIG. 4 is a schematic circuit diagram of an application of the circuit.

FIGS. 2, 3 and 4 show an embodiment of the invention in which a protective layer 4, **4*a* is included in a security logic as an active conductor run. Removal of the protective layer 4, 4*a* interrupts the operation of the circuit in a protected region 6** underneath.

A similar apparatus can be manufactured by a method which is known as the "hump technique" for the assembly of integrated circuits on substrates or film. With these humps 7, chips may be directly soldered to the substrate. According to the operations of the hump fabrication, the protective layer 4 which in this embodiment is formed of copper and other metal layers, is applied while being insulated by the hump technique and structured according to the desired construction of the circuits underneath which are to be protected. A photo technique for etching contact windows in the passivating layer that are required for preparing the humps, can likewise be applied.

While FIG. 2 shows a cross section through a circuit structured in accordance with the invention, the surface of the circuit is diagrammatically shown in FIG. 3. Reference symbols K1, K2, K3 and K4 designate contacts passing through the passivating layer.

FIG. 4 shows an embodiment including protective layers 4, 4*a* in a circuit of a so-called security logic. Lines SP1, SP2 represent internal column lines of a memory field with two read-out amplifiers V1, V2, which are the lines to be protected against unauthorized read-out. In case of an authorized access to the memory field, two transistors T1, T2 connected in the column lines SP1, SP2 are cut off by a control signal LES. If this is not the case, both column lines are firmly at logical zero.

The protective layer according to the invention is tied into the transmission of this control signal LES leading to the transistors T1, T2, in such a way that the protective layer 4 located between the through contacts K4 and K3 covers the memory field to be protected. The further protective layer 4*a* which is a conductor run located between the through contacts K1 and K2 and is acted upon by the inverted control signal LES, is an additional protective measure against attempts to remove the protective layer 4 in an unauthorized yet selective manner, such as by etching. Any interruption of the protective layers 4, 4*a* leads to switching the two transistors T1 and T2 into conduction because of a logic gate 8 (NAND gate), to which the two connections are fed.

As is shown in FIG. 3, the through contacts K1, K2 and K3 are so close together geometrically that making contact with measuring prods, for instance, after an attempt at etching, is made difficult. As soon as the two protective layers 4, 4*a* exhibit an electrical contact, the transistors T1, T2 are likewise conducting because of the logic gate connected to them.

The foregoing is a description corresponding in substance to German application No. P 34 28 235.1, filed July 31, 1984, the International priority of which is being claimed for the instant application, and which is hereby made part of this application. Any material discrepancies between the foregoing specification and the aforementioned corresponding German application are to be resolved in favor of the latter.

I claim:

1. Monolithically integrated semiconductor circuit assembly which includes a silicon substrate having a surface, an active layer having a surface and active electrical structures disposed on the surface of said silicon substrate, comprising a semiconductor circuit which includes: a passivating layer having a surface disposed on the surface of said active layer; at least one electrically conducting protective layer disposed on the surface of said passivating layer at least above said active electrical structures in operative switching engagement with said active electrical structures; a casing disposed above said protective layer; said protective layer being electrically conductingly connected at least at one point through said passivating layer to said active electrical structures in said active layer; said semiconductor circuit including a security logic circuit; said protective layer being connected into said security logic circuit as a metallic electrical connecting part thereof for disabling said security logic circuit in response to said protective layer having at least part thereof removed, thereby preventing an analysis of the circuit assembly.

2. Semiconductor circuit assembly according to claim 1, including contacts recessed through said passivating layer to said at least one protective layer, said contacts being geometrically placed for preventing external contact of an individual one of said contacts by external contacting means.

3. Monolithically integrated semiconductor circuit assembly which includes a silicon substrate having a surface, an active layer having a surface and active electrical structures disposed on the surface of said substrate, comprising a semiconductor circuit which includes: a passivating layer having a surface, disposed on the surface of said active layer; at least one electrically conducting protective layer disposed on the surface of said passivating layer at least above said active electrical structures; a casing disposed above said protective layer; a security logic circuit; wherein said protective layer is electrically conductingly connected at least at one point through said passivating layer to said electrical structures in said active layer; and said protective layer is connected into said security logic circuit as an electrical connecting part thereof.

4. Semiconductor circuit assembly according to claim 3, including contacts recessed through said passivating layer to said at least one protective layer, said contacts being geometrically placed for preventing external contact of an individual one of said contacts by external contacting means.

5. Monolithically integrated semiconductor circuit assembly which includes a silicon substrate having a surface, an active layer having a surface and active electrical structures disposed on the surface of said silicon substrate, comprising a semiconductor circuit which includes: a passivating layer having a surface disposed on the surface of said active layer; at least one electrically conducting protective layer disposed on the surface of said passivating layer at least above said active electrical structures in operative switching engagement with said active electrical structures; a casing disposed above said protective layer; said protective layer being electrically conductingly connected at least at one point through said passivating layer to said active electrical structures in said active layer; said semiconductor circuit including a security logic circuit; said protective layer being connected into said security logic cirguit as a metallic electrical connecting part thereof for disabling said security logic circuit in response to said protective layer having at least part thereof removed, wherein said security logic circuit includes a logic gate having an input side, said at least one protective layer includes at least one further independent protective layer being connected to said input side of said logic gate and being acted upon by a signal essential for operation of said semiconductor circuit.

6. Monolithically integrated semiconductor circuit assembly which includes a silicon substrate having a surface, an active layer having a surface and active electrical structures disposed on the surface of said substrate, comprising a semiconductor circuit which includes: a passivating layer having a surface, disposed on the surface of said active layer; at least one electrically conducting protective layer disposed on the surface of said passivating layer at least above said active electrical structures; a casing disposed above said protective layer; a security logic circuit; wherein said protective layer is electrically conductingly connected at least at one point through said passivating layer to said active electrical structures in said active layer; and said protective layer is connected into said security logic circuit as an electrical connecting part thereof; said semiconductor circuit includes a logic gate having an input side; said at least one protective layer includes at least one further independent protective layer being connected to said input side of said logic gate and being acted upon by a signal essential for operation of said semiconductor circuit.

* * * * *